C. LOWRY.
TIRE ARMOR.
APPLICATION FILED MAR. 1, 1921.

1,412,695.

Patented Apr. 11, 1922.
3 SHEETS—SHEET 1.

Cassandra Lowry,
INVENTOR

BY Victor J. Evans
ATTORNEY

WITNESS:

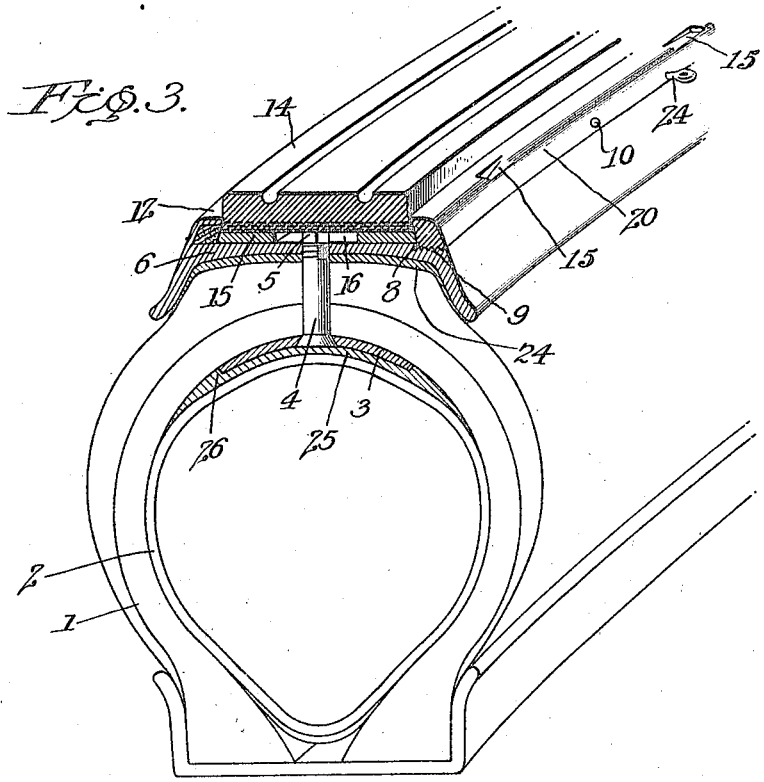
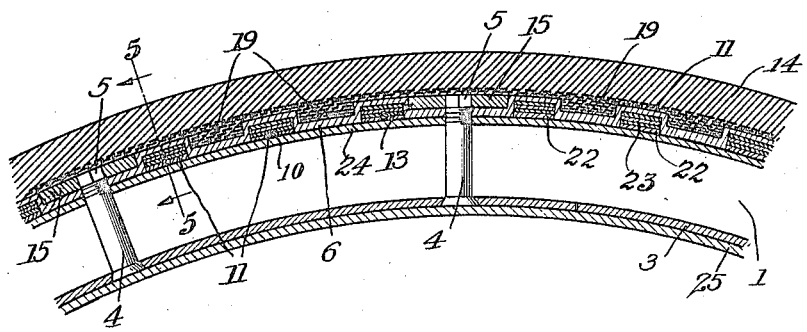

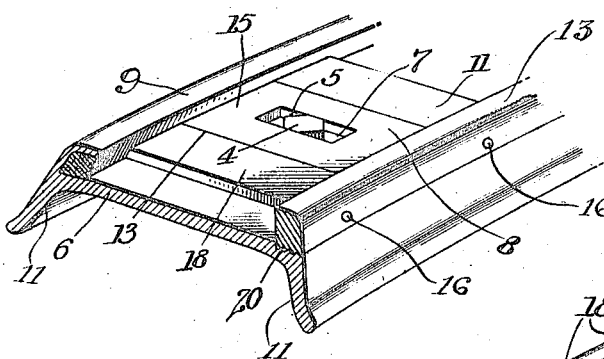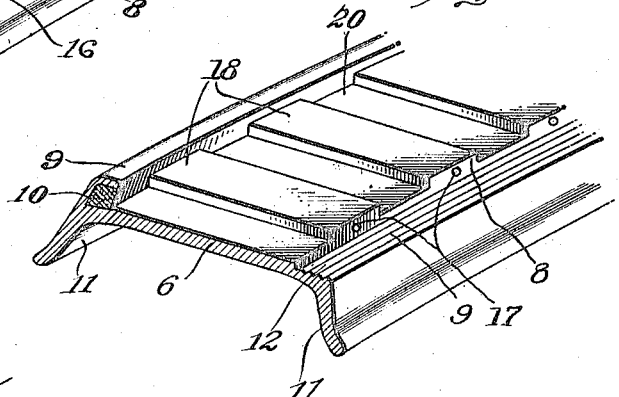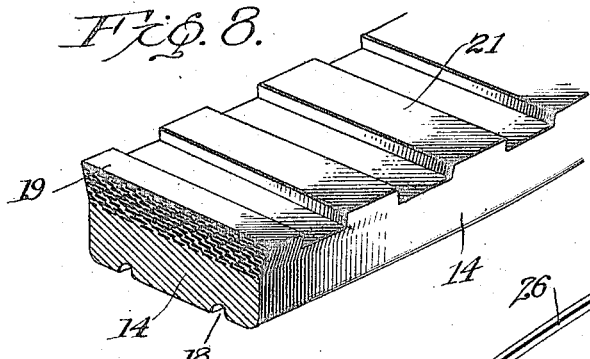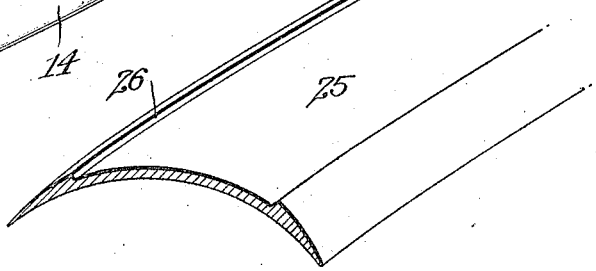

UNITED STATES PATENT OFFICE.

CASSANDRA LOWRY, OF CHICAGO, ILLINOIS.

TIRE ARMOR.

1,412,695.

Specification of Letters Patent. Patented Apr. 11, 1922.

Application filed March 1, 1921. Serial No. 448,839.

*To all whom it may concern:*

Be it known that I, CASSANDRA LOWRY, a citizen of the United States, residing at Chicago, in the county of Cook and State of Illinois, have invented new and useful Improvements in Tire Armor, of which the following is a specification.

This invention relates to armor for pneumatic tires and an object of the invention is to provide a tire armor which may be mounted upon the tread portion of a pneumatic tire for increasing the longevity of the tire by relieving its tread portion of wear and also by decreasing liability of puncture.

Another object of this invention is to provide an armor for mounting about the tread portion of a pneumatic tire for vehicle wheels which is constructed so that it may be relatively easily attached to or removed from a tire, and one which, owing to its resiliency will not detract from the cushioning proclivities of the tire upon which it is mounted.

Other objects of the invention will appear in the following detailed description and in the accompanying drawing wherein:

Fig. 3 is a detail transverse section through the improved tire armor showing it applied.

Fig. 4 is a fragmentary circumferential section taken on the line 4—4 of Fig. 2.

Fig. 6 is a fragmentary perspective partly in section of the tire armor.

Fig. 7 is a fragmentary view similar to Fig. 6 illustrating a different part of the tire armor from that shown in Fig. 6.

Fig. 8 is a fragmentary perspective of the cushion tread of the improved tire armor.

Fig. 9 is a fragmentary perspective, partly in section of a reliner used in connection with the tire armor.

Figure 1:
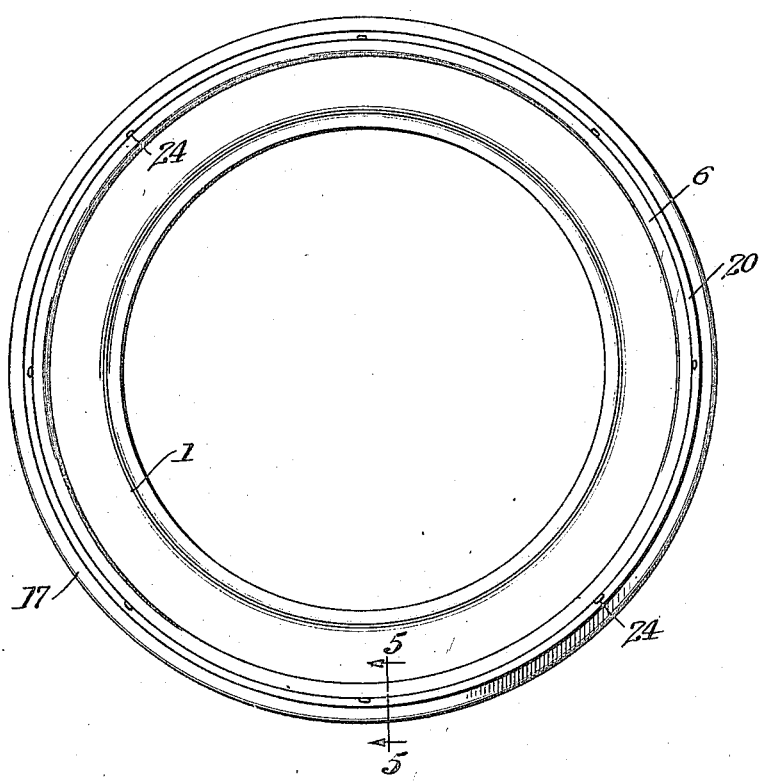
Fig. 1 is a side elevation of a tire having the improved armor mounted thereon.
Figure 2:
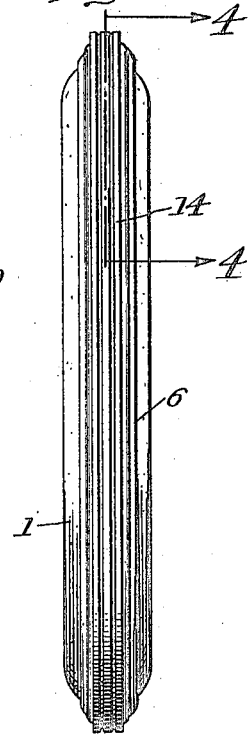
Fig. 2 is a front elevation of the tire having the armor mounted thereon.
Figure 5:
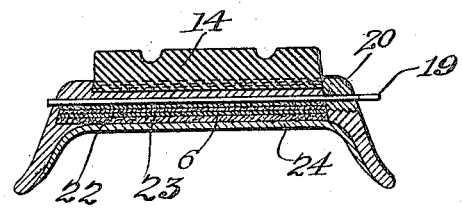
Fig. 5 is a detail cross section through the tire armor taken at a point remote from that upon which the section illustrated in Fig. 3 is taken, and more specifically taken on the line 5—5 of Fig. 4.

Referring more particularly to the drawing an ordinary approved type of pneumatic tire 1, having the usual form of inflatable inner tube 2, is shown, upon the tread portion of which the improved armor is mounted. The improved tire armor comprises an inner split ring 3 which is mounted within the tire 1 and which is connected to the outer tread carrying rim 6 of the tire armor by bolts 4. The bolts 4 may be spaced circumferentially about the tire structure 1 and inserted through suitable openings formed in the tire. In the drawing, the bolts 4 are illustrated as provided with polygonal end portions 5 engaging in suitable slots 7 formed in tire plates 8 to prevent accidental rotation of the bolts. It is to be understood, however, that ordinary nuts may be mounted upon the ends of the bolts 4 and retained from turning movement in any suitable manner if it is so desired, without departing from the spirit of this invention. The tread carrying member 6 of the improved tire armor is constructed of any suitable type of sheet metal and it has an annular bead 9 formed along one side thereof which may be hollow and stuffed or filled with any suitable material, such as granular asbestos as indicated at 10. Tread overhanging flanges 11 are formed along each side of the tread carrying member 6 and are shaped to fit the tread portion of a pneumatic tire 1. The outer surface of the perimeter of the member 6, at its side edge opposite the bead 9 is externally screw threaded as shown at 12 to permit detachable connection therewith of the removable tread confining bead 13, which co-acts with the bead 9 for confining the cushion tread 14 upon the perimeter of the armor structure. The tread confining bead 13 may be provided with circumferentially spaced indentations 15 to facilitate its mounting upon the member 6 and it is also provided with transversely extending openings 16 which register with transversely extending openings 17 formed in the raised portions 18 of the member 6 as will be noted by particular reference to Fig. 7 of the drawing, a plurality of openings 17 are provided in relatively close proximity one to the other as are also the openings 16 so as to permit proper registration of some of these openings when the ring 13 is properly tightened upon the band or member 6. Suitable locking keys 19 are inserted through the registering openings 16 and 17 for locking the ring 13 against accidental turning movement relative to the member 6. The raised portions 18 are spaced equidistant about the perimeter of the member 6 providing recesses or spaces 20 between their facing edges which receive therein extensions 21 formed upon the inner perimeter of the cushion tread 14 and the extensions 21 engaging in the recesses 20 will prevent relative rotary movement of the cushion tread 14 and member 6, the latter member being held against rotary movement relative to the tire 1 by the bolts 4.

As previously stated the member 6 is preferably formed of sheet metal pressed into shape and consequently providing recesses therein formed by outstruck portions 18. The recesses 22 thus formed are each filled with a plurality of layers 23 of sheet asbestos or analogous heat insulating material which will prevent overheating of the tread portion of the tire 1. A reliner 24 of asbestos or analogous material is placed between the inner surface of the member 6 and the tread portion of the tire 1 as clearly shown in Fig. 3 of the drawing and a suitable reliner 25 is mounted within the tire 1 and is provided with an annular recess providing shoulders 26 against which the edges of the split ring 3 engage.

In assembling the improved armor and mounting it upon the tread of a pneumatic tire, the split ring 3 is positioned within the tire, and the tire is drilled to receive the bolts 4 after which the member 6, with the ring 13 removed, is mounted upon the tread portion of the tire 1 and the bolts 4 are then inserted, connecting the tire 1, split ring 3 and member 6. The resilient tread 14 is then forced in a lateral manner from the side of the member or band 6 upon which the ring 13 is to be mounted, over the member or band 6 the lugs or ribs 21 on the cushion tread engaging in the recesses 20 in the member or band 6. After the cushion tread 14 has been properly positioned, the binding ring 13 is threaded upon the member 6 and locked against movement by the transverse pins 19 thus assembling the armor structure upon the tread portion of the tire 1.

It is, of course, to be understood that the invention may be constructed in various other manners and the parts associated in different relations and, therefore, I do not desire to be limited in any manner except as set forth in the claims hereunto appended.

Having thus described my invention what I claim is:

1. An armor for pneumatic tires comprising a tire tread engaging band provided with circumferentially spaced raised portions about its perimeter, a cushion tread having circumferentially spaced recesses in its inner perimeter adapted to receive said raised portions to lock said cushion tread and band against relative movement, an annular bead formed upon one edge of said band, and a removable ring threadably mounted on the opposite edge of said band, said ring and bead co-acting to prevent transverse movement of said cushion tread relative to said band.

2. An armor for pneumatic tires comprising a tire tread engaging band provided with circumferentially spaced raised portions about its perimeter, a cushion tread having circumferentially spaced recesses in its inner perimeter adapted to received said raised portions to lock said cushion tread and band against relative circumferential movement, an annular bead formed upon one edge of said band, a removable ring threadably mounted on the opposite edge of said band, said ring and bead co-acting to prevent transverse movement of said cushion tread relative to said band, said band provided with circumferentially spaced recesses in its inner perimeter, heat insulating material in said recesses, and a reliner of heat insulating nonabrasive material engaging the inner perimeter of said band.

3. An armor for pneumatic tires comprising a tire tread engaging band provided with circumferentially spaced raised portions about its perimeter, a cushion tread having circumferentially spaced recesses in its inner perimeter adapted to receive said raised portions to lock said cushion tread and band against relative circumferential movement, an annular bead formed upon one edge of said band, a removable ring threadably mounted on the opposite edge of said band, said ring and bead co-acting to prevent transverse movement of said cushion tread relative to said band, said removable ring and band provided with registering openings and locking pins inserted in said openings to prevent accidental movement of the ring relative to the band.

In testimony whereof I affix my signature.

CASSANDRA LOWRY.